US 12,349,107 B2

(12) United States Patent
Ai et al.

(10) Patent No.: US 12,349,107 B2
(45) Date of Patent: Jul. 1, 2025

(54) METHODS, APPARATUS AND SYSTEMS FOR SCHEDULING AND TRANSMISSION OF SYSTEM INFORMATION IN A WIRELESS COMMUNICATION

(71) Applicant: ZTE CORPORATION, Shenzhen (CN)

(72) Inventors: Jianxun Ai, Shenzhen (CN); He Huang, Shenzhen (CN); Jing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 113 days.

(21) Appl. No.: 18/105,671

(22) Filed: Feb. 3, 2023

(65) Prior Publication Data
US 2023/0224861 A1 Jul. 13, 2023

Related U.S. Application Data

(63) Continuation of application No. PCT/CN2020/007316, filed on Aug. 6, 2020.

(51) Int. Cl.
*H04W 68/02* (2009.01)
*H04W 76/28* (2018.01)

(52) U.S. Cl.
CPC ........... *H04W 68/02* (2013.01); *H04W 76/28* (2018.02)

(58) Field of Classification Search
CPC .............................. H04W 68/02; H04W 76/28
See application file for complete search history.

(56) References Cited

U.S. PATENT DOCUMENTS

2022/0078728 A1\* 3/2022 Yi ........................ H04W 48/16
2023/0085484 A1 3/2023 Liu

FOREIGN PATENT DOCUMENTS

| CN | 111345072 A | 6/2020 |
| CN | 111345075 A | 6/2020 |
| JP | 2022-509914 A | 1/2022 |

(Continued)

OTHER PUBLICATIONS

Japanese office action issued in JP Patent Application No. 2023-503155, dated Jan. 31, 2024, 8 pages. English translation included.

(Continued)

*Primary Examiner* — Diane D Mizrahi
(74) *Attorney, Agent, or Firm* — Perkins Coie LLP

(57) ABSTRACT

Methods, apparatus and systems for scheduling and transmission of system information in a wireless communication are disclosed. In one embodiment, a method performed by a wireless communication node is disclosed. The method comprises: transmitting, to a first wireless communication device having a first device type, a first configuration associated with the first device type for the first wireless communication device to perform paging occasion monitoring, wherein a device having the first device type is a reduced capability device or is configured with extended discontinuous reception (eDRX); and transmitting, to a second wireless communication device having a second device type, a second configuration associated with the second device type for the second wireless communication device to perform paging occasion monitoring, wherein a device having the second device type is not a reduced capability device and not configured with eDRX.

10 Claims, 13 Drawing Sheets

(56) References Cited

FOREIGN PATENT DOCUMENTS

| WO | 2020060952 A1 | 3/2020 |
| WO | 2020089854 A1 | 5/2020 |

OTHER PUBLICATIONS

Huawei et al., "Other aspects for reduced capability devices," 3GPP TSG RAN WG1 Meeting #101-e, R1-2004612, E-meeting, May 25-Jun. 5, 2020, 6 pages.

3GPP TS 38.331 V16.1.0 (Jul. 2020), Technical Specification, 3rd Generation Partnership Project; Technical Specification Group Radio Access Network; NR; Radio Resource Control (RRC) protocol specification (Release 16); pp. 418-420.

International Search Report and Written Opinion issued in International Patent Application No. PCT/CN2020/107316, dated May 6, 2021, 10 pages.

International Preliminary Report on Patentability issued in International Patent Application No. PCT/CN2020/107316, dated Feb. 7, 2023, 7 pages.

Japanese notice of allowance issued in JP Patent Application No. 2023-503155, dated Jul. 22, 2024, 3 pages. English translation included.

European Search Report issued in EP Patent Application No. 20948836.0, dated Jun. 4, 2024, 13 pages.

Partial European Search Report issued in EP Patent Application No. 20948836.0, dated Mar. 13, 2024, 16 pages.

OPPO, "Discussion on UE complexity reduction," 3GPP TSG RAN WG1 #101, R1-2004104, e-Meeting, May 25-Jun. 5, 2020, 6 pages.

OPPO, "Left issues on SIB and cell reselection for NR-V2X.", 3GPP TSG-RAN WG2 Meeting #107bis, R2-1912066., Chongqing, China, Oct. 3, 2019 (Oct. 3, 2019), 6 pages.

ZTE, "Views on power saving enhancement.", 3GPP TSG RAN WG1 #101, R1-2003489.,eMeeting, May 16, 2020 (May 16, 2020), 11 pages.

Ericsson, "Wake-up signal UE grouping.", 3GPP TSG-RAN WG2 #103bis, R2-1815148, Chengdu, P.R. China, Sep. 28, 2018 (Sep. 28, 2018), 5 pages.

Qualcomm Incorporated, "Considerations for Complexity Reduction of RedCap Devices.", 3GPP TSG-RAN WG1 Meeting #101, R1-2004493, eMeeting, May 16, 2020 (May 16, 2020), 7 pages.

Canadian office action issued in CA Patent Application No. 3,186,661, dated Nov. 8, 2024, 5 pages.

European Communication pursuant to Article 94(3) EPC issued in EP Patent Application No. 20948836.0, dated Apr. 10, 2025, 5 pages.

* cited by examiner

METHODS, APPARATUS AND SYSTEMS FOR SCHEDULING AND TRANSMISSION OF SYSTEM INFORMATION IN A WIRELESS COMMUNICATION

TECHNICAL FIELD

The disclosure relates generally to wireless communications and, more particularly, to methods, apparatus and systems for scheduling and transmission of system information in a wireless communication.

BACKGROUND

To support radio access of industrial sensors, smart wearable and video surveillance, etc., a kind of low cost and low complexity device or reduced capability device is introduced in a wireless communication following a current standard, e.g. in a fifth-generation (5G) new radio (NR) system. The reduced capability device has limited capability compared to normal NR user equipment (UE) in order to save device complexity, UE power consumption and device cost. To fulfill these requirements, a series of capability may be lowered compared to normal NR UE. These capabilities may include smaller downlink and uplink bandwidth, longer communication delay, less transmission and reception antennas, etc. According to current standard, a UE may be configured with extended discontinuous reception (eDRX) cycle and operate in eDRX.

Existing methods according to current standard have drawbacks, especially for UEs with reduced capability or configured with eDRX. In one example, when a UE operating in eDRX monitors paging occasions with the same configuration as normal UEs, the base station (BS) cannot change the paging configuration for normal UEs within an eDRX acquisition period. In another example, a UE needs to monitor paging occasion or receive a paging message, only for receiving a system information change notification, which is not power efficient for the UE. In addition, an indicator from the BS is needed for a UE to verify whether its locally stored system information is valid; and the UE uses a hyper system frame number (H-SFN) to get time synchronized with the BS. But there is not enough space in a master information block (MIB) message to carry this indicator or the H-SFN. Further, there is no cell reselection method in current standard for a reduced capability UE.

Thus, existing systems and methods for system information scheduling and cell reselection in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: transmitting, to a first wireless communication device having a first device type, a first configuration associated with the first device type for the first wireless communication device to perform paging occasion monitoring, wherein a device having the first device type is a reduced capability device or is configured with extended discontinuous reception (eDRX); and transmitting, to a second wireless communication device having a second device type, a second configuration associated with the second device type for the second wireless communication device to perform paging occasion monitoring, wherein a device having the second device type is not a reduced capability device and not configured with eDRX.

In another embodiment, a method performed by a wireless communication node is disclosed. The method comprises: transmitting, before paging occasions for a wireless communication device, a notification in a signaling associated with the paging occasions. The notification notifies the wireless communication device about a change of system information associated with the wireless communication node.

In yet another embodiment, a method performed by a wireless communication node is disclosed. The method comprises: transmitting, on a paging occasion for a wireless communication device, a downlink control information (DCI) scheduling a paging message. The DCI includes an indicator indicating whether the wireless communication device is configured to monitor, after receiving the DCI, N remaining paging occasion(s) associated the paging occasion.

In still another embodiment, a method performed by a wireless communication node is disclosed. The method comprises: transmitting, to a wireless communication device, a signaling carrying information related to: system information update of the wireless communication node, or time synchronization between the wireless communication device and the wireless communication node. The signaling is at least one of: a wake up signal (WUS) transmitted before paging occasions associated with the WUS, a DCI scheduling a system information message, a DCI scheduling a paging message, a DCI scrambled with paging radio network temporary identifier (P-RNTI), or a physical broadcasting channel (PBCH) payload.

In a different embodiment, a method performed by a wireless communication node is disclosed. The method comprises: transmitting, to a first wireless communication device having a first device type, a first configuration associated with the first device type for the first wireless communication device to perform cell reselection, wherein a device having the first device type is a reduced capability device; and transmitting, to a second wireless communication device having a second device type, a second configuration associated with the second device type for the second wireless communication device to perform cell reselection, wherein a device having the second device type is not a reduced capability device.

In a further embodiment, a method performed by a wireless communication device having a first device type is disclosed. The method comprises: receiving, from a wireless communication node, a first configuration associated with the first device type, wherein a device having the first device type is a reduced capability device or is configured with extended discontinuous reception (eDRX); and monitoring paging occasions based on the first configuration, wherein a second configuration associated with a second device type for paging occasion monitoring is configured by the wireless communication node, wherein a device having the second device type is not a reduced capability device and not configured with eDRX.

In another embodiment, a method performed by a wireless communication device is disclosed. The method comprises: receiving, before paging occasions for the wireless communication device, a notification in a signaling associated with the paging occasions from a wireless communication node. The notification notifies the wireless communication device about a change of system information associated with the wireless communication node.

In yet another embodiment, a method performed by a wireless communication device is disclosed. The method comprises: receiving, on a paging occasion for the wireless communication device from a wireless communication node, a downlink control information (DCI) scheduling a paging message; and determining, based on an indicator in the DCI, whether to monitor, after receiving the DCI, N remaining paging occasion(s) associated the paging occasion.

In still another embodiment, a method performed by a wireless communication device is disclosed. The method comprises: receiving, from a wireless communication node, a signaling carrying information related to: system information update of the wireless communication node, or time synchronization between the wireless communication device and the wireless communication node. The signaling is at least one of: a wake up signal (WUS) received before paging occasions associated with the WUS, a DCI scheduling a system information message, a DCI scheduling a paging message, a DCI scrambled with P-RNTI, or a physical broadcasting channel (PBCH) payload.

In a different embodiment, a method performed by a wireless communication device having a first device type is disclosed. The method comprises: receiving, from a wireless communication node, a first configuration associated with the first device type, wherein a device having the first device type is a reduced capability device; and performing cell reselection based on the first configuration, wherein a second configuration associated with a second device type for cell reselection is configured by the wireless communication node, wherein a device having the second device type is not a reduced capability device.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a core network, a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

Figure 1:
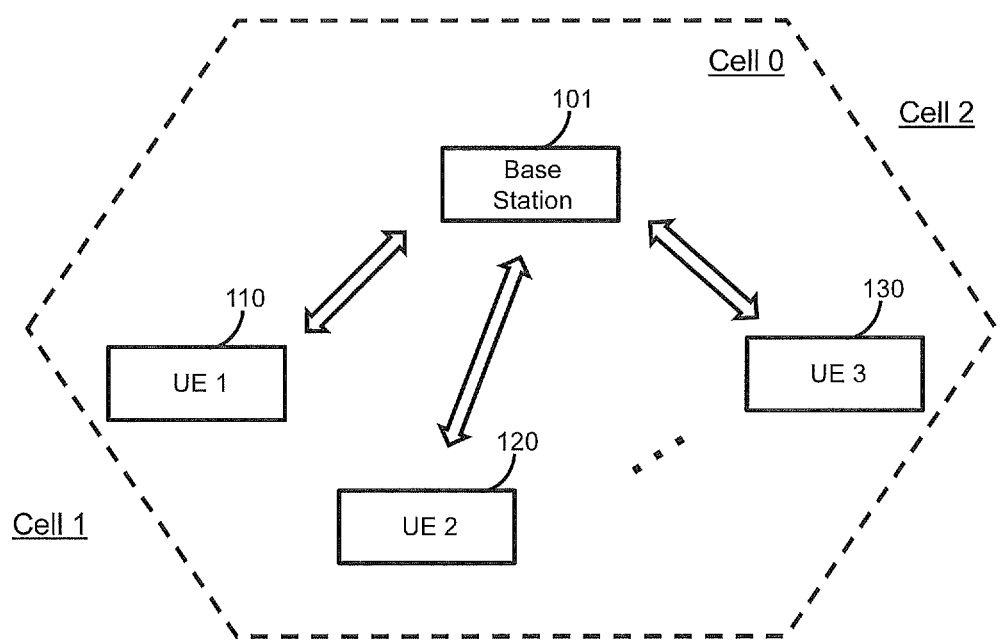
FIG. 1 illustrates an exemplary communication network in which techniques disclosed herein may be implemented, in accordance with an embodiment of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes multiple neighbor cells, Cell 0, Cell 1 and Cell 2. Cell 0 includes a base station (BS) 101 and a plurality of UEs, UE 1 110, UE 2 120 ... UE 3 130, where the BS 101 can communicate with the UEs according to wireless protocols within the Cell 0. A UE may just enter the Cell 0, e.g. from Cell 1, or may have been in an idle mode for a while in the Cell 0. It that case, a paging process is performed before the UE can communicate service data with the BS 101. For example, a paging message may be transmitted by the BS 101 and detected by the UE to establish a service connection between the UE and the BS 101, or say to wake up the UE.

A UE may monitor paging occasions for receiving a paging message according to a paging configuration. The paging configuration includes at least one of the following information: (a) a paging control channel (PCCH) configuration which may include a default paging cycle (e.g. a default DRX value), the number of paging occasions per paging frame, the number of total paging frames in a certain time period, which is the shortest value of UE specific paging cycle if configured a default paging cycle), an offset to determine the position of paging frame, and/or the first PDCCH monitoring occasion of each paging occasion of the paging frame; (b) a downlink bandwidth part (BWP) on which UE monitors physical downlink control channel (PDCCH) for paging radio network temporary identifier (P-RNTI); or (c) a search space configuration configured for the downlink BWP. The UE monitors PDCCH for P-RNTI on the PDCCH occasions as configured in the search space configuration. A UE in radio resource control (RRC) IDLE or RRC INACTIVE may monitor paging occasions on an initial downlink BWP which is configured in system information.

A UE may be configured with extended discontinuous reception (eDRX) cycle and operate in eDRX. A UE operating in eDRX may monitor paging occasions according to at least one of following rules: (1) when within a paging time window (PTW), the UE monitors paging occasions according to a minimal value of: default DRX value, UE specific DRX value and UE's radio access network (RAN) paging cycle if configured; (2) when out of PTW, the UE monitors paging occasions according to UE's RAN paging cycle if configured.

In one embodiment, the PTW is UE specific and is determined by a paging hyperframe, a starting position within the hyperframe, and/or an ending position within the paging hyperframe. The eDRX cycle may be longer than a system information modification period. A UE operating in eDRX may update system information according to following rules. First, when the UE receives an indicator which indicates system information modification for eDRX UE via a downlink control information (DCI) or a paging message, the UE acquires updated system information at the next eDRX acquisition period boundary. An eDRX acquisition period is a time period whose boundary is determined by a predefined rule, e.g. H-SFN mod N=0, where H-SFN is the hyper system frame number, and N is the length of eDRX acquisition period. Second, before the UE initiates RRC setup or RRC resume procedure, the UE operating in eDRX may first verify whether its locally stored system information is valid by comparing system information value tag or checking a system information unchanged indicator. If the stored system information is no longer valid, the UE may acquire system information before initiating the RRC setup or RRC resume procedure.

Figure 2:
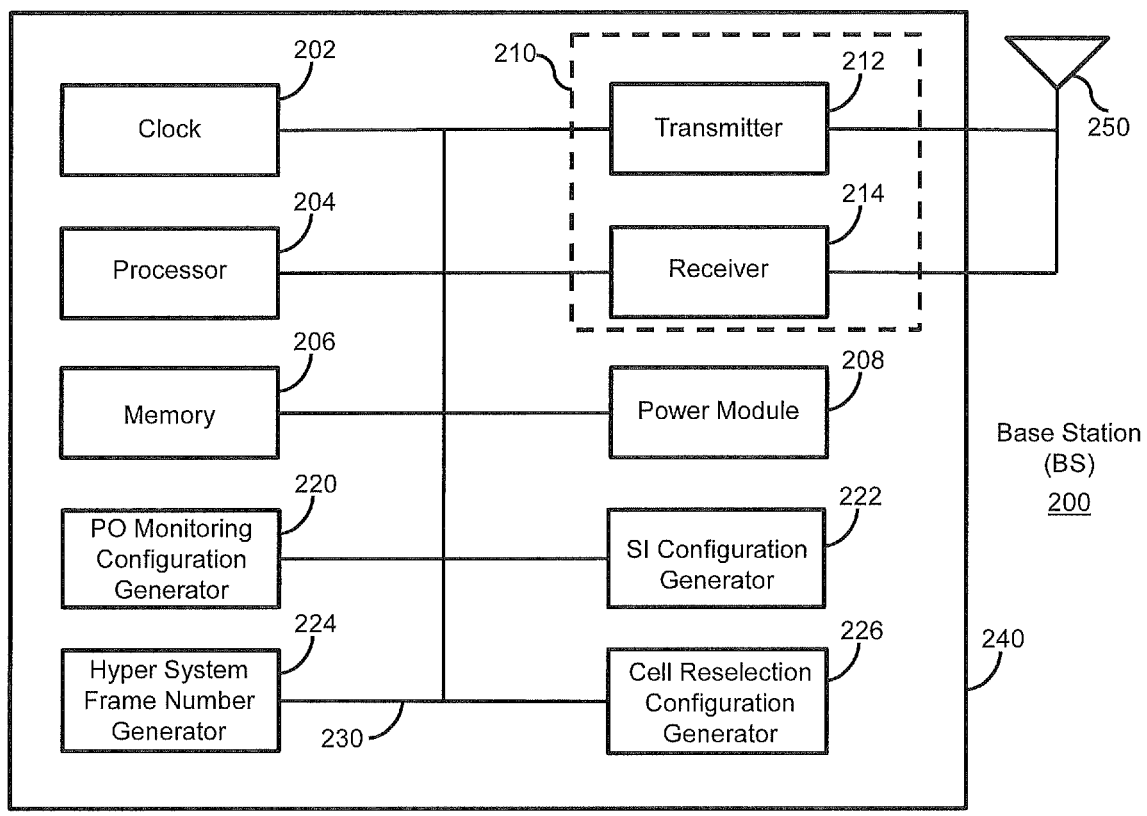
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a PO (paging occasion) monitoring configuration generator 220, an SI (system information) configuration generator 222, a hyper system frame number generator 224, and a cell reselection configuration generator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the PO monitoring configuration generator 220 in the BS 200 may generate a first configuration associated with a first UE type, which relates to UEs with reduced capability or configured with extended discontinuous reception (eDRX); and generate a second configuration associated with a second UE type, which relates to UEs not with reduced capability and not configured with eDRX. The PO monitoring configuration generator 220 may transmit, via the transmitter 212 to a first UE having the first UE type, the first configuration for the first UE to perform paging occasion monitoring; and transmit, via the transmitter 212 to a second UE having the second UE type, the second configuration for the second UE to perform paging occasion monitoring. The first configuration is not the second configuration, and may be distinguished from the second configuration by name or ID.

In one embodiment, the first configuration is transmitted for a first downlink bandwidth part (BWP) dedicated to the first device type; and the second configuration is transmitted for a second downlink BWP different from the first downlink BWP. The first configuration may comprise information related to at least one of: a paging control channel (PCCH) configuration associated with the first device type, a search space configuration dedicated for paging occasion monitoring associated with the first device type, a control resource set configuration associated with the first device type, or a radio network temporary identifier (RNTI) dedicated for paging occasion monitoring associated with the first device type. When a configuration information related to paging occasion monitoring is missing in the first configuration, a corresponding configuration information for an initial downlink BWP may be configured for the first UE to perform paging occasion monitoring.

In another embodiment, the first configuration and the second configuration are transmitted for a same downlink BWP. The first configuration comprises information related to at least one of: a paging control channel (PCCH) configuration associated with the first device type, a search space configuration dedicated for paging occasion monitoring associated with the first device type, a control resource set configuration associated with the first device type, or a radio network temporary identifier (RNTI) dedicated for paging occasion monitoring associated with the first device type. The first configuration is contained in a system information block (SIB) dedicated for the first device type or in a SIB shared by the first and second device types. When a configuration information related to paging occasion monitoring is missing in the first configuration, a corresponding configuration information configured for the second device type for the same BWP may be configured for the first UE to perform paging occasion monitoring.

The PO monitoring configuration generator 220 may also generate an indicator in a downlink control information (DCI) scheduling a paging message; and transmit, via the transmitter 212 on a paging occasion for a UE, the DCI including the indicator. The indicator indicates whether the UE is configured to monitor, after receiving the DCI, N remaining paging occasion(s) associated the paging occasion. According to various embodiments, the N represents at least one of: a number of paging occasion(s) following a paging occasion within a same paging time window as the paging occasion on which the DCI is transmitted; or a number of remaining paging occasion(s) configured to be in a same group as the paging occasion on which the DCI is transmitted.

The SI configuration generator 222 in this example may generate a notification to notify a UE about a change of system information associated with the BS 200; and transmit, via the transmitter 212 before paging occasions for the UE, the notification in a signaling associated with the paging occasions.

In one embodiment, the notification is at least one of: a system information change notification transmitted during a system information modification period for the system information to be updated from next system information modification period; a system information change notification for UEs operating in eDRX; or a system information change notification for UEs operating in eDRX and in a radio resource control (RRC) inactive state. In one embodiment, the signaling is at least one of: a wake up signal (WUS) associated with the paging occasions; a downlink control information (DCI) transmitted on a physical downlink control channel (PDCCH); a DCI scheduling a system information message; a DCI scheduling a paging message; a DCI scrambled with P-RNTI, a physical broadcasting channel (PBCH) payload; or a signal transmitted on a predefined time and frequency resource. Whether the UE monitors the paging occasions after receiving the signaling may be configured based on at least one of: the signaling, a RRC message or system information.

The PO monitoring configuration generator 220 may also generate information related to a system information value tag or a system information unchanged indicator, which indicates whether system information associated with the BS 200 is changed over a time period. The PO monitoring configuration generator 220 can transmit, via the transmitter 212 to a UE, the information in at least one of: a wake up signal (WUS) transmitted before paging occasions associated with the WUS, a DCI scheduling a system information message, a DCI scheduling a paging message, a DCI scrambled with P-RNTI, or a physical broadcasting channel (PBCH) payload. In one embodiment, the time period is determined based on at least one of: a standard, a protocol, a predetermined system information validity time, a RRC message or system information.

The hyper system frame number generator 224 in this example may generate information related to a hyper system frame number (H-SFN). The hyper system frame number generator 224 can transmit, via the transmitter 212 to a UE, the information in at least one of the signaling: a wake up signal (WUS) transmitted before paging occasions associated with the WUS, a DCI scheduling a system information message, a DCI scheduling a paging message, a DCI scrambled with P-RNTI, or a physical broadcasting channel (PBCH) payload. In one embodiment, the information carried in the signaling is a part of the H-SFN; and the remaining part of the H-SFN is transmitted in a system information block.

The cell reselection configuration generator 226 in this example may generate a first configuration associated with a first UE type, which relates to UEs with reduced capability; and generate a second configuration associated with a second UE type, which relates to UEs not with reduced capability. The cell reselection configuration generator 226 may transmit, via the transmitter 212 to a first UE having the first UE type, the first configuration for the first UE to perform cell reselection; and transmit, via the transmitter 212 to a second UE having the second UE type, the second configuration for the second UE to perform cell reselection.

The first configuration is not the second configuration, and may be distinguished from the second configuration by name or ID.

In one embodiment, the first configuration is transmitted via a system information block (SIB) for the first UE to perform inter-frequency cell reselection. The first configuration comprises information related to at least one of: a first list of inter-frequency carrier frequencies that support device access of the first device type, wherein the first list is not a current inter-frequency carrier frequency list configured for device access of the second device type; a first indicator in a current configuration contained in the current inter-frequency carrier frequency list, wherein the first indicator indicates that a corresponding carrier frequency of the current configuration supports device access of the first device type; a second list of inter-frequency black cells configured for the first device type in a current configuration contained in the current inter-frequency carrier frequency list, wherein any cell in the second list is not considered by the first UE as candidate for cell reselection; a third list of inter-frequency neighbor cells configured for the first device type in a current configuration contained in the current inter-frequency carrier frequency list, wherein each cell in the third list is considered by the first UE as candidate for cell reselection; a second indicator in an inter-frequency neighbor cell configuration contained in the current inter-frequency carrier frequency list, wherein the second indicator indicates that a corresponding neighbor cell of the inter-frequency neighbor cell configuration supports device access of the first device type; or a cell reselection priority dedicated for the first device type in a current configuration contained in the current inter-frequency carrier frequency list, wherein the cell reselection priority is used by the first UE to perform cell reselection evaluation.

In another embodiment, the first configuration is transmitted via a system information block (SIB) for the first UE to perform intra-frequency cell reselection. The first configuration comprises information related to at least one of: a fourth list of intra-frequency black cells configured for the first device type in the SIB, wherein any cell in the fourth list is not considered by the first UE as candidate for cell reselection; a fifth list of intra-frequency neighbor cells configured for the first device type in the SIB, wherein each cell in the fifth list is considered by the first UE as candidate for cell reselection; or a third indicator in an intra-frequency neighbor cell configuration contained in the SIB, wherein the third indicator indicates that a corresponding neighbor cell of the intra-frequency neighbor cell configuration supports device access of the first device type.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the PO monitoring configuration generator 220. Conversely, each of the modules illustrated in FIG. 2 can be implemented using a plurality of separate components or elements.

Figure 3A:
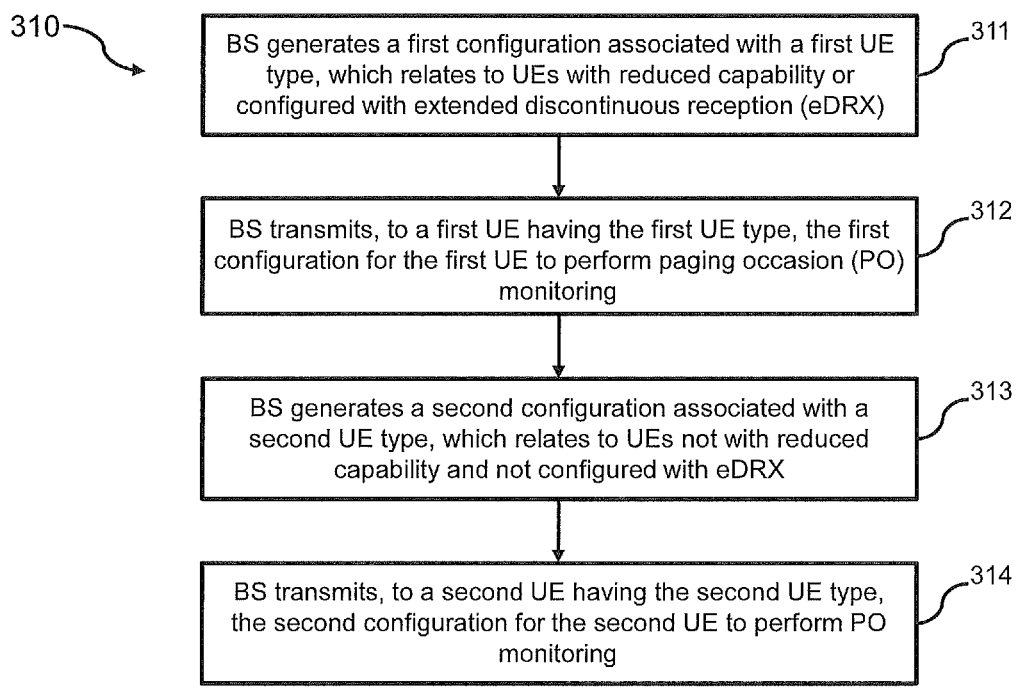
FIGS. 3A-3E illustrate flow charts of methods performed by a BS, in accordance with some embodiments of the present disclosure.

FIG. 3A illustrates a flow chart for a method 310 performed by a BS, e.g. the BS 200 in FIG. 2, in accordance with some embodiments of the present disclosure. At operation 311, the BS generates a first configuration associated with a first UE type, which relates to UEs with reduced capability or configured with extended discontinuous reception (eDRX). At operation 312, the BS transmits, to a first UE having the first UE type, the first configuration for the first UE to perform paging occasion (PO) monitoring. At operation 313, the BS generates a second configuration associated with a second UE type, which relates to UEs not with reduced capability and not configured with eDRX. At operation 314, the BS transmits, to a second UE having the second UE type, the second configuration for the second UE to perform PO monitoring. The order of the operations shown in FIG. 3A may be changed according to different embodiments of the present disclosure.

Figure 3B:
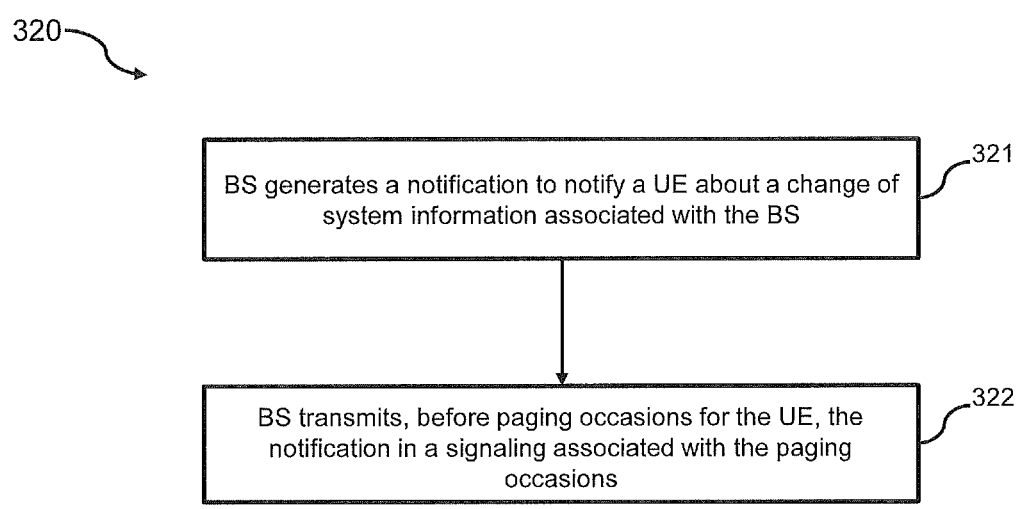

FIG. 3B illustrates a flow chart for another method 320 performed by a BS, e.g. the BS 200 in FIG. 2, in accordance with some embodiments of the present disclosure. At operation 321, the BS generates a notification to notify a UE about a change of system information associated with the BS. At operation 322, the BS transmits, before paging occasions for the UE, the notification in a signaling associated with the paging occasions. The order of the operations shown in FIG. 3B may be changed according to different embodiments of the present disclosure.

Figure 3C:
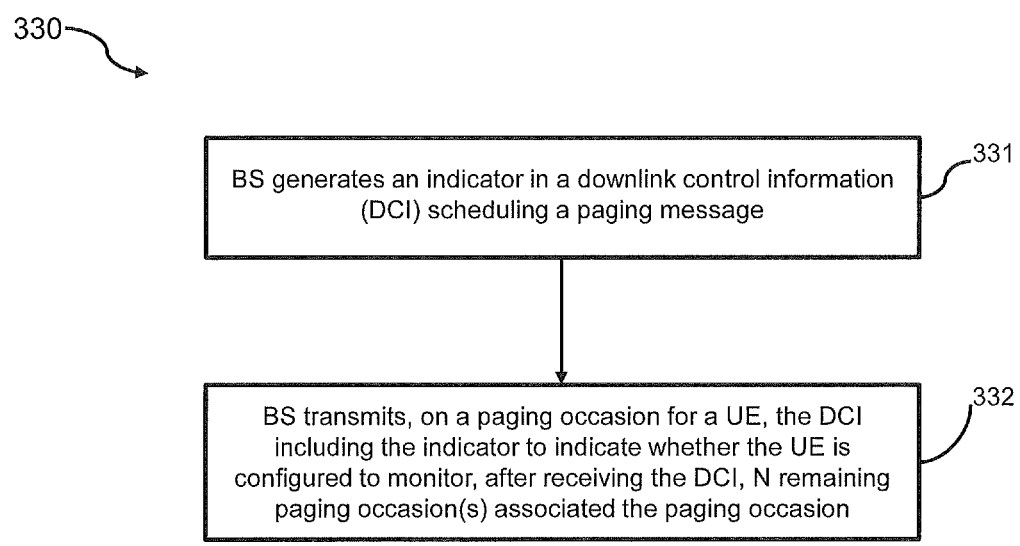

FIG. 3C illustrates a flow chart for another method 330 performed by a BS, e.g. the BS 200 in FIG. 2, in accordance with some embodiments of the present disclosure. At operation 331, the BS generates an indicator in a downlink control information (DCI) scheduling a paging message. At operation 332, the BS transmits, on a paging occasion for a UE, the DCI including the indicator. The indicator indicates whether the UE is configured to monitor, after receiving the DCI, N remaining paging occasion(s) associated the paging occasion. The order of the operations shown in FIG. 3C may be changed according to different embodiments of the present disclosure.

Figure 3D:
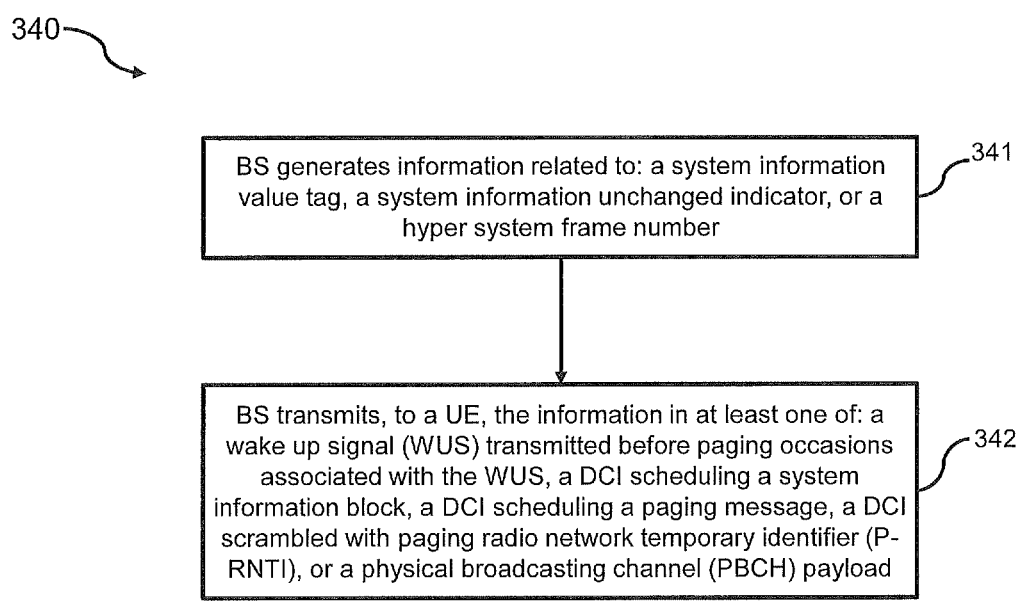

FIG. 3D illustrates a flow chart for another method 340 performed by a BS, e.g. the BS 200 in FIG. 2, in accordance with some embodiments of the present disclosure. At operation 341, the BS generates information related to: a system information value tag, a system information unchanged indicator, or a hyper system frame number. At operation 342, the BS transmits, to a UE, the information in at least one of: a wake up signal (WUS) transmitted before paging occasions associated with the WUS, a DCI scheduling a system information message, a DCI scheduling a paging message, a DCI scrambled with P-RNTI, or a physical broadcasting channel (PBCH) payload. The order of the operations shown in FIG. 3D may be changed according to different embodiments of the present disclosure.

Figure 3E:
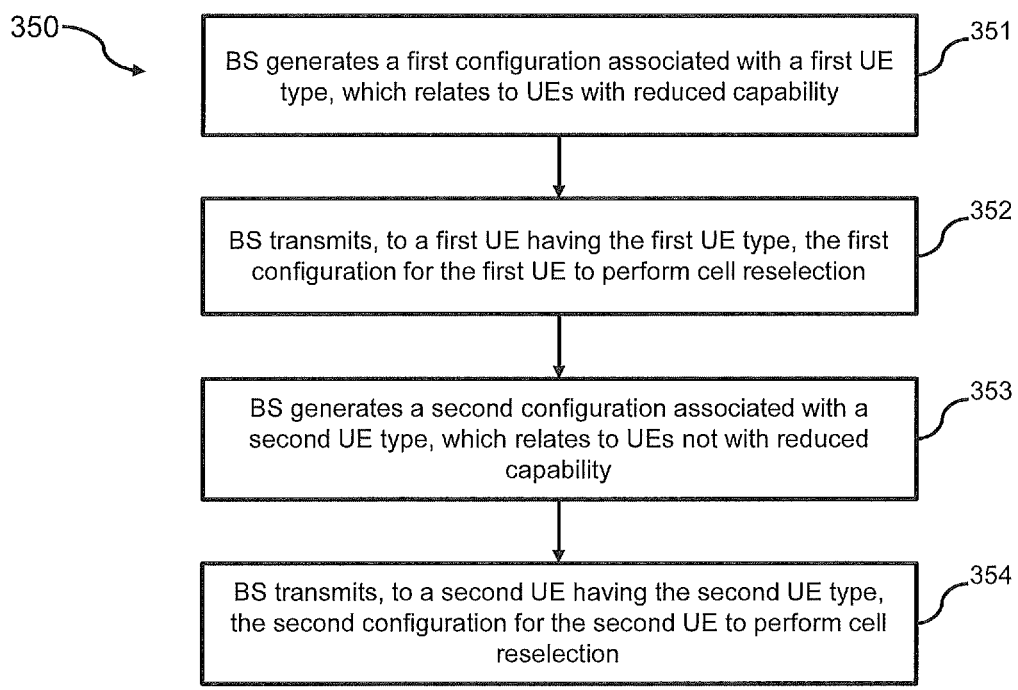

FIG. 3E illustrates a flow chart for another method 350 performed by a BS, e.g. the BS 200 in FIG. 2, in accordance with some embodiments of the present disclosure. At operation 351, the BS generates a first configuration associated with a first UE type, which relates to UEs with reduced capability. At operation 352, the BS transmits, to a first UE having the first UE type, the first configuration for the first UE to perform cell reselection. At operation 353, the BS generates a second configuration associated with a second UE type, which relates to UEs not with reduced capability. At operation 354, the BS transmits, to a second UE having the second UE type, the second configuration for the second UE to perform cell reselection. The first configuration is not the second configuration, and may be distinguished from the second configuration by name or M. The order of the operations shown in FIG. 3E may be changed according to different embodiments of the present disclosure.

Figure 4:
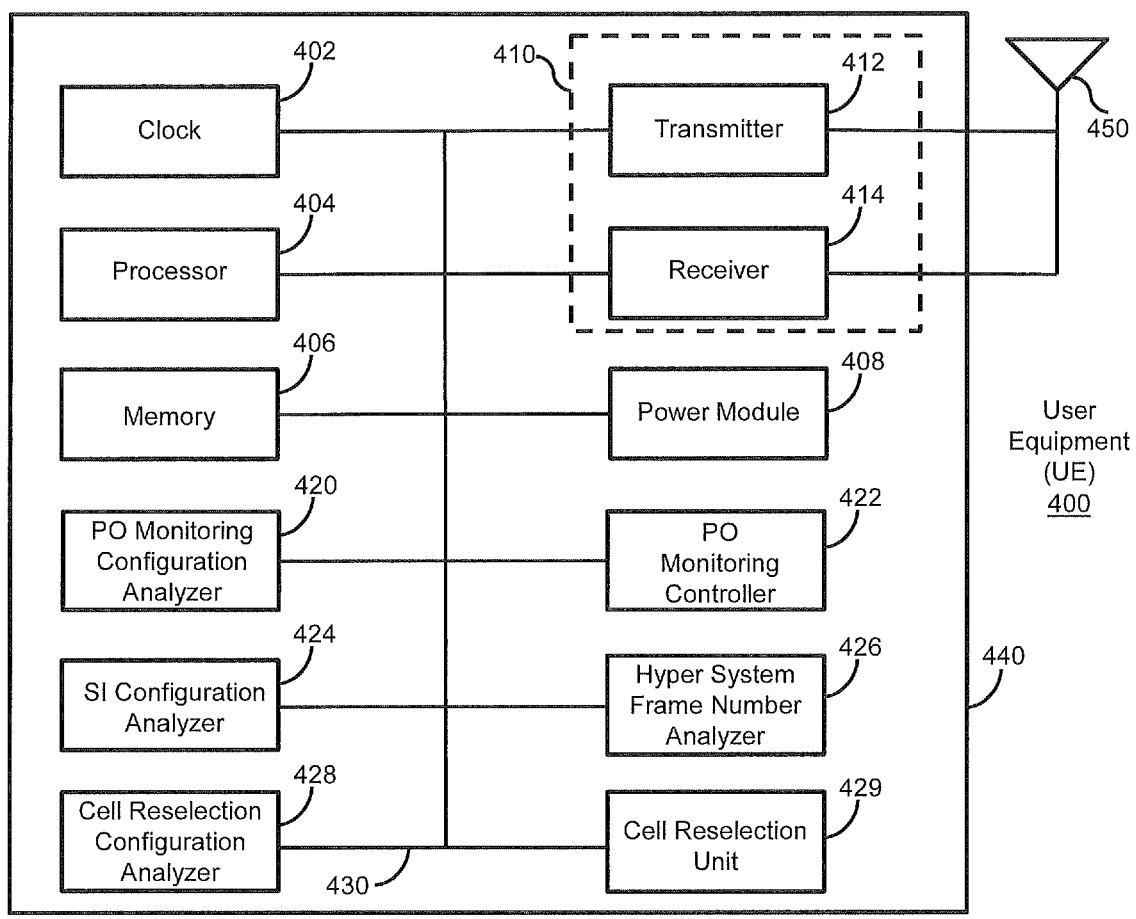
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a PO monitoring configuration analyzer 420, a PO monitoring controller 422, an SI configuration analyzer 424, a hyper system frame number analyzer 426, a cell reselection configuration analyzer 428, and a cell reselection unit 429.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

In this embodiment, the UE 400 has a first UE type, which relates to UEs with reduced capability or configured with extended discontinuous reception (eDRX). The PO monitoring configuration analyzer 420 in this example may receive, via the receiver 414, a first configuration associated with the first device type from a BS. The PO monitoring configuration analyzer 420 may analyze the first configuration. A second configuration is configured by the BS for paging occasion monitoring associated with a second device type relating to UEs not with reduced capability and not configured with eDRX. The PO monitoring controller 422 in this example may control the UE 400 to monitor paging occasions based on the first configuration.

In one embodiment, the first configuration is received for a first downlink bandwidth part (BWP) dedicated to the first device type; and the second configuration is received for a second downlink BWP different from the first downlink BWP. The first configuration may comprise information related to at least one of: a paging control channel (PCCH) configuration associated with the first device type, a search space configuration dedicated for paging occasion monitoring associated with the first device type, a control resource set configuration associated with the first device type, or a radio network temporary identifier (RNTI) dedicated for paging occasion monitoring associated with the first device type. When a configuration information related to paging occasion monitoring is missing in the first configuration, a corresponding configuration information for an initial downlink BWP may be applied by the UE 400 to perform paging occasion monitoring.

In another embodiment, the first configuration and the second configuration are received for a same downlink BWP. The first configuration comprises information related to at least one of: a paging control channel (PCCH) configuration associated with the first device type, a search space configuration dedicated for paging occasion monitoring associated with the first device type, a control resource set configuration associated with the first device type, or a radio network temporary identifier (RNTI) dedicated for paging occasion monitoring associated with the first device type. The first configuration is contained in a system information block (SIB) dedicated for the first device type or in a SIB shared by the first and second device types. When a configuration information related to paging occasion monitoring is missing in the first configuration, a corresponding configuration information configured for the second device type for the same BWP may be applied by the UE 400 to perform paging occasion monitoring.

The PO monitoring configuration analyzer 420 may also receive, via the receiver 414 on a paging occasion for the UE 400 from a BS, and analyze a downlink control information (DCI) scheduling a paging message. The PO monitoring controller 422 may determine, based on an indicator in the DCI, whether the UE 400 will monitor, after receiving the DCI, N remaining paging occasion(s) associated the paging occasion. According to various embodiments, the N represents at least one of: a number of paging occasion(s) following the paging occasion within a same paging time window as the paging occasion on which the DCI is received; or a number of remaining paging occasion(s) configured to be in a same group as the paging occasion on which the DCI is received.

The SI configuration analyzer 424 in this example may receive, via the receiver 414 before paging occasions for the UE 400, a notification in a signaling associated with the paging occasions from a BS. The SI configuration analyzer 424 can analyze the notification for the UE 400 to be notified about a change of system information associated with the BS.

In one embodiment, the notification is at least one of: a system information change notification received during a system information modification period for the system information to be updated from next system information modification period; a system information change notification for UEs operating in eDRX; or a system information change notification for UEs operating in eDRX and in a radio resource control (RRC) inactive state. In one embodiment, the signaling is at least one of: a wake up signal (WUS) associated with the paging occasions; a downlink control information (DCI) received on a physical downlink control channel (PDCCH); a DCI scheduling a system information message; a DCI scheduling a paging message; a DCI scrambled with P-RNTI; a physical broadcasting channel (PBCH) payload; or a signal received on a predefined time and frequency resource. The PO monitoring controller 422 may determine whether to monitor the paging occasions after receiving the signaling, based on at least one of: the signaling, a RRC message or system information.

The SI configuration analyzer 424 may also receive, via the receiver 414 from a BS, a signaling being at least one of: a wake up signal (WUS) received before paging occasions associated with the WUS, a DCI scheduling a system information message, a DCI scheduling a paging message, a DCI scrambled with P-RNTI, or a physical broadcasting channel (PBCH) payload. The SI configuration analyzer 424 may analyze the signaling to obtain information related to a system information value tag or a system information unchanged indicator, which indicates whether system information associated with the BS is changed over a time period. In one embodiment, the time period is determined based on at least one of: a standard, a protocol, a predetermined system information validity time, a RRC message or system information.

The hyper system frame number analyzer 426 in this example may receive, via the receiver 414 from a BS, a signaling being at least one of the following signaling: a wake up signal (WUS) received before paging occasions associated with the WUS, a DCI scheduling a system information message, a DCI scheduling a paging message, a DCI scrambled with P-RNTI, or a physical broadcasting channel (PBCH) payload. The hyper system frame number analyzer 426 may analyze the signaling to obtain information related to a hyper system frame number (H-SFN). In one embodiment, the information carried in the signaling is a part of the H-SFN; and the remaining part of the H-SFN is received in a system information block.

In one embodiment, while the UE 400 has a first UE type, which relates to UEs with reduced capability, the cell reselection configuration analyzer 428 in this example may receive, via the receiver 414, a first configuration associated with the first device type from a BS. The cell reselection configuration analyzer 428 may analyze the first configuration. The cell reselection unit 429 in this example may perform cell reselection based on the first configuration. A second configuration is configured by the BS for cell reselection associated with a second device type relating to UEs not with reduced capability.

In one embodiment, the first configuration is received via a system information block (SIB) for the UE 400 to perform inter-frequency cell reselection. The first configuration comprises information related to at least one of: a first list of inter-frequency carrier frequencies that support device access of the first device type, wherein the first list is not a current inter-frequency carrier frequency list configured for device access of the second device type; a first indicator in a current configuration contained in the current inter-frequency carrier frequency list, wherein the first indicator indicates that a corresponding carrier frequency of the current configuration supports device access of the first device type; a second list of inter-frequency black cells configured for the first device type in a current configuration contained in the current inter-frequency carrier frequency list, wherein any cell in the second list is not considered by the UE 400 as candidate for cell reselection; a third list of inter-frequency neighbor cells configured for the first device type in a current configuration contained in the current inter-frequency carrier frequency list, wherein each cell in the third list is considered by the UE 400 as candidate for cell reselection; a second indicator in an inter-frequency neighbor cell configuration contained in the current inter-frequency carrier frequency list, wherein the second indicator indicates that a corresponding neighbor cell of the inter-frequency neighbor cell configuration supports device access of the first device type; or a cell reselection priority dedicated for the first device type in a current configuration contained in the current inter-frequency carrier frequency list, wherein the cell reselection priority is used by the UE 400 to perform cell reselection evaluation.

In another embodiment, the first configuration is received via a system information block (SIB) for the UE 400 to perform intra-frequency cell reselection. The first configuration comprises information related to at least one of: a fourth list of intra-frequency black cells configured for the first device type in the SIB, wherein any cell in the fourth list is not considered by the UE 400 as candidate for cell reselection; a fifth list of intra-frequency neighbor cells configured for the first device type in the SIB, wherein each cell in the fifth list is considered by the UE 400 as candidate for cell reselection; or a third indicator in an ultra-frequency neighbor cell configuration contained in the SIB, wherein the third indicator indicates that a corresponding neighbor cell of the intra-frequency neighbor cell configuration supports device access of the first device type.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the PO monitoring configuration analyzer 420. Conversely, each of the modules illustrated in FIG. 4 can be implemented using a plurality of separate components or elements.

Figure 5A:
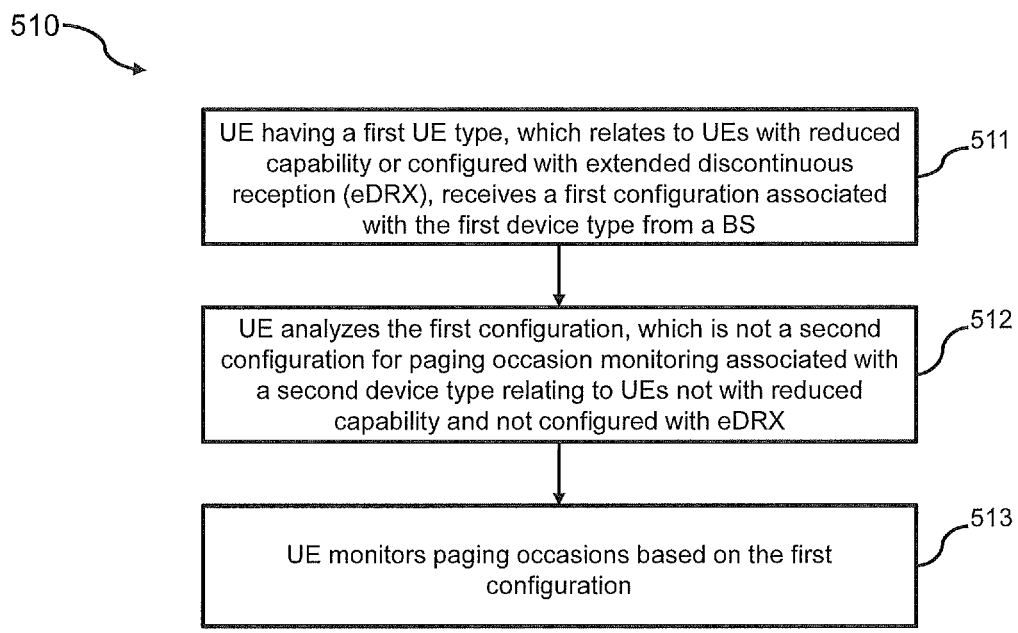
FIGS. 5A-5E illustrate flow charts of methods performed by a UE, in accordance with some embodiments of the present disclosure.

FIG. 5A illustrates a flow chart for a method 510 performed by a UE, e.g. the UE 400 in FIG. 4, in accordance with some embodiments of the present disclosure. At operation 511, the UE having a first UE type, which relates to UEs with reduced capability or configured with extended discontinuous reception (eDRX), receives a first configuration associated with the first device type from a BS. At operation 512, the UE analyzes the first configuration. A second configuration is configured by the BS for paging occasion monitoring associated with a second device type relating to UEs not with reduced capability and not configured with eDRX. At operation 513, the UE monitors paging occasions based on the first configuration. The order of the operations shown in FIG. 5A may be changed according to different embodiments of the present disclosure.

Figure 5B:
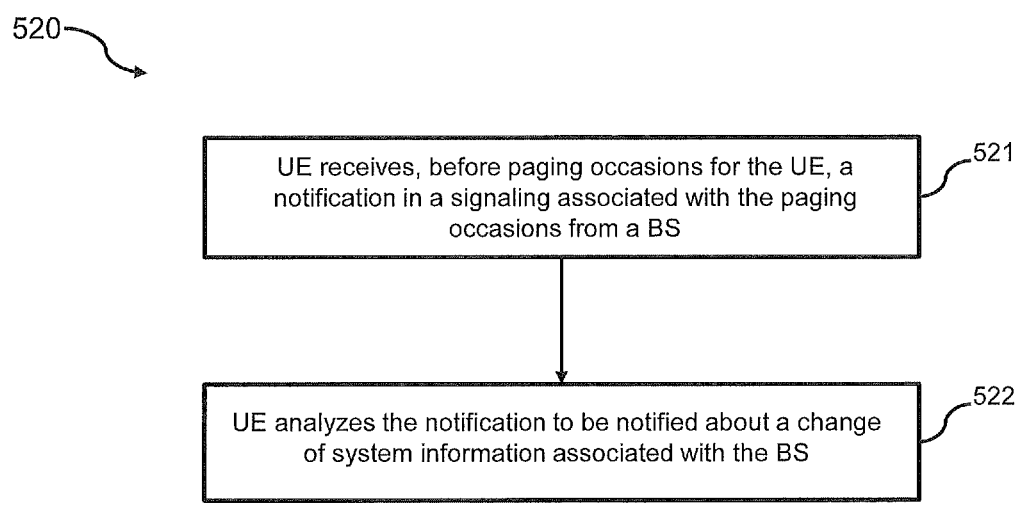

FIG. 5B illustrates a flow chart for another method 520 performed by a UE, e.g. the UE 400 in FIG. 4, in accordance with some embodiments of the present disclosure. At operation 521, the UE receives, before paging occasions for the UE, a notification in a signaling associated with the paging occasions from a BS. At operation 522, the UE analyzes the notification to be notified about a change of system information associated with the BS. The order of the operations shown in FIG. 5B may be changed according to different embodiments of the present disclosure.

Figure 5C:
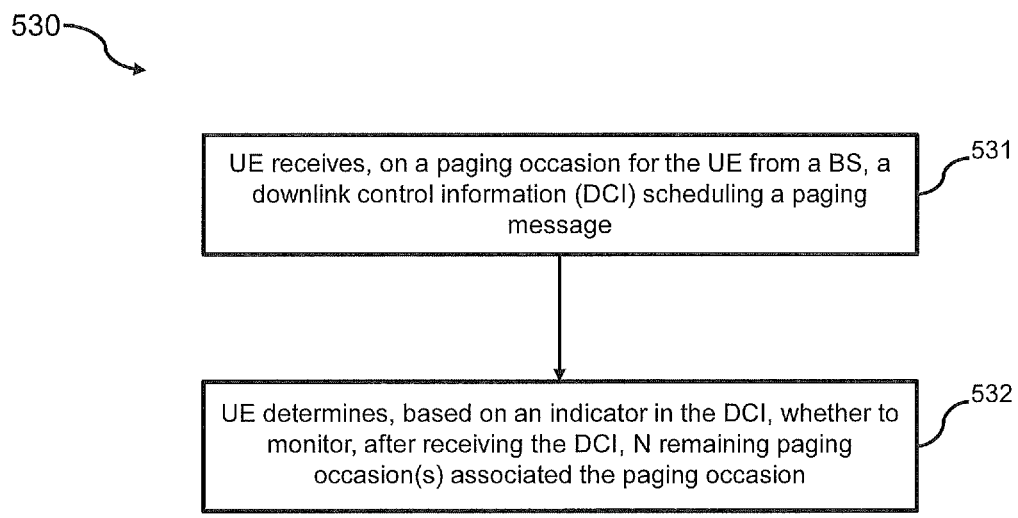

FIG. 5C illustrates a flow chart for another method 530 performed by a UE, e.g. the UE 400 in FIG. 4, in accordance with some embodiments of the present disclosure. At operation 531, the UE receives, on a paging occasion for the UE from a BS, a downlink control information (DCI) scheduling a paging message. At operation 532, the UE determines, based on an indicator in the DCI, whether to monitor, after receiving the DCI, N remaining paging occasion(s) associated the paging occasion. The order of the operations shown in FIG. 5C may be changed according to different embodiments of the present disclosure.

Figure 5D:
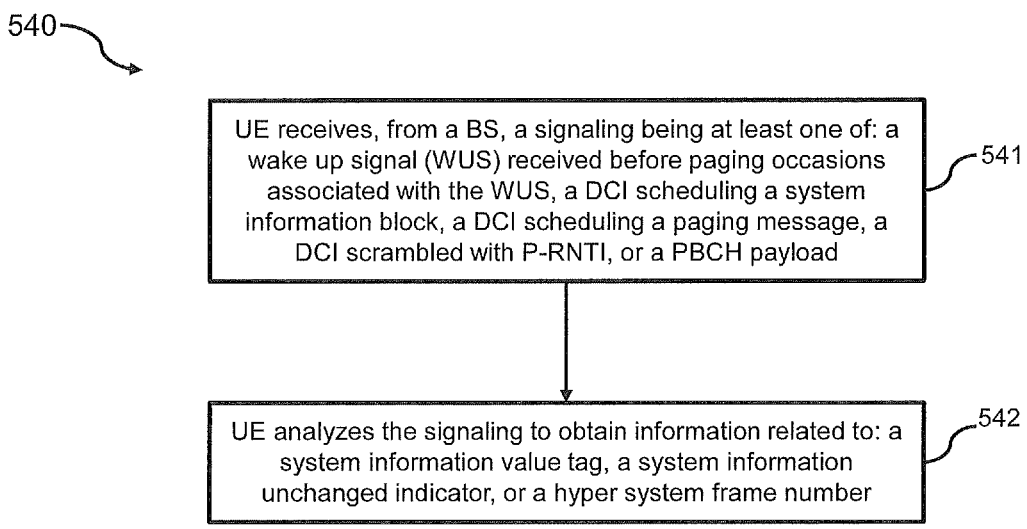

FIG. 5D illustrates a flow chart for another method 540 performed by a UE, e.g. the UE 400 in FIG. 4, in accordance with some embodiments of the present disclosure. At operation 541, the UE receives, from a BS, a signaling being at least one of: a wake up signal (WUS) received before paging occasions associated with the WUS, a DCI scheduling a system information message, a DCI scheduling a paging message, a DCI scrambled with P-RNTI, or a physical broadcasting channel (PBCH) payload. At operation 542, the UE analyzes the signaling to obtain information related to: a system information value tag, a system information unchanged indicator, or a hyper system frame number. The order of the operations shown in FIG. 5D may be changed according to different embodiments of the present disclosure.

Figure 5E:
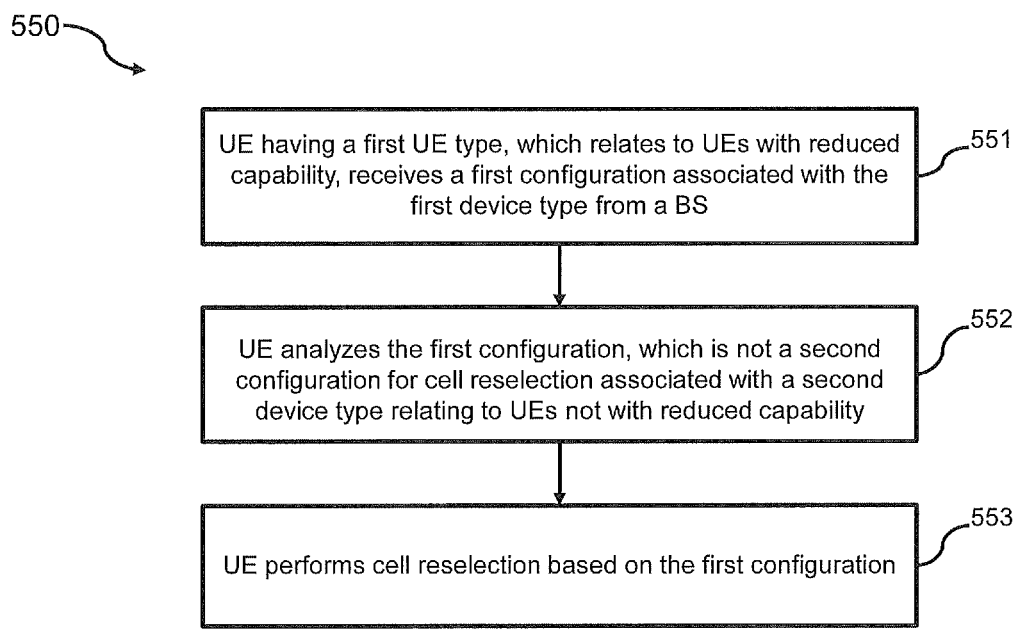

FIG. 5E illustrates a flow chart for another method 550 performed by a UE, e.g. the UE 400 in FIG. 4, in accordance with some embodiments of the present disclosure. At operation 551, the UE having a first UE type, which relates to UEs with reduced capability, receives a first configuration associated with the first device type from a BS. At operation 552, the UE analyzes the first configuration. A second configuration is configured by the BS for cell reselection associated with a second device type relating to UEs not with reduced capability. At operation 553, the UE performs cell reselection based on the first configuration. The order of the operations shown in FIG. 5E may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, a paging configuration is configured specific to eDRX UE or reduced capability UE (hereinafter "redcap UE"). A BS may configure paging configuration for a UE which is configured with eDRX with an eDRX specific downlink BWP which is different from the initial downlink BWP as defined in current standard for UE not operating in eDRX. A UE which is configured with eDRX or operates in eDRX may monitor paging occasions on this eDRX specific downlink BWP.

The BS may configure the eDRX UE specific or redcap UE specific downlink BWP configuration in a system information block. The system information block may be system information block type 1 (SIB1). The configuration of eDRX specific or redcap UE specific downlink BWP includes configuration related to paging occasion monitoring. Specifically, the configuration may include one or more following information: (a) a PCCH configuration, which may include one of following: a default paging cycle, the number of paging occasion(s) per paging frame, the number of total paging frame(s) in a certain time period, an offset to determine the position of paging frame, the first PDCCH monitoring occasion of each paging occasion of the paging frame, etc.; (b) a search space configuration, according to which the UE monitors PDCCH for P-RNTI, where the search space configuration may be a search space ID which is defined in initial downlink BWP, and/or may comprises a set of search space configurations; (c) a control resource set configuration. The UE may apply the configuration configured in eDRX specific or redcap UE specific downlink BWP for paging occasion monitoring. If one information related to paging occasion monitoring is not configured for the eDRX specific or redcap UE specific downlink BWP, the UE applies the corresponding configuration configured for initial downlink BWP.

In some embodiment, a BS may configure in a downlink BWP, e.g. initial downlink BWP as defined in current standard, at least one of the following configurations dedicated for eDRX UE or for redcap UE: (a) a PCCH configuration which may include one or more of the following parameters: a default paging cycle (e.g. a default DRX value), the number of paging occasion(s) per paging frame, the number of total paging frame(s) in a certain time period, an offset to determine the position of paging frame, or the first PDCCH monitoring occasion of each paging occasion of the paging frame; (b) a search space dedicated for paging occasion monitoring for UE operating in eDRX or redcap UE; or (c) a RNTI dedicated for paging occasion monitoring for UE operating in eDRX or redcap UE. These configurations may be contained in SIB dedicated for eDRX UE or redcap UE, or contained in SIB shared with non-eDRX UE.

The UE operating in eDRX applies these configurations for paging occasion monitoring. If one information related to paging occasion monitoring is not configured for UE operating in eDRX or redcap UE, the UE operating in eDRX or redcap UE applies the corresponding information configured in the same downlink BWP for UE not operating in eDRX.

According to a current standard, the BS needs to guarantee that a UE operates in eDRX can receives paging message. The UE operating in eDRX will not update system information until next eDRX acquisition period which may be a very long time period. Thus, if a UE operating in eDRX monitors paging occasions with the same configuration as other UEs, the BS cannot change the paging configuration for normal UEs within an eDRX acquisition period, which brings inconvenience to the BS.

With the method provided in this embodiment, the BS may configure a different PCCH configuration, a different search space, or a different downlink BWP for paging occasion monitoring for UE operating in eDRX. Thus, the BS can reconfigure the configuration for UE not operating in eDRX without impact on UE operating in eDRX.

For redcap UE, the transmission of DCI scheduling paging message, and transmission of paging message may be different from those for non-redcap UEs, in that transmission repetition is needed for coverage recovery, i.e. to compensate the coverage loss due to low capability of redcap UE. As such, to configure redcap UE specific paging configuration is beneficial for system resource efficiency. For example, paging monitoring and paging message transmission of a non-redcap UE will not be impacted by the redcap UE.

In a second embodiment, a system information change notification is generated and transmitted. A system information change notification may be transmitted in a DCI scheduling paging message or in a paging message. A UE may be configured to receive a WUS signal before monitoring associated paging occasions. A WUS signal is associated with a number of paging occasions following the WUS signal. If the WUS signal is detected, the UE will monitor its associated paging occasions. Otherwise, the UE is not required to monitor the associated following paging occasions. In one embodiment, a UE will anyway detect a WUS before monitoring associated following paging occasions. In that case, after the system information change notification is transmitted, the UE will monitor paging occasions, receive a DCI scrambled by P-RNTI, or receive a paging message, just for receiving the system information change notification.

In the second embodiment, a system information change notification is transmitted by a BS in a signaling before a paging occasion. In a first example, the system information change notification may be a system information change notification which is transmitted during a system information modification period. The system information is updated by the BS from the next system information modification period. A UE receiving this system information change notification acquires system information in the next system information modification period. In a second example, the system information change notification may be a system information change notification specific for UE operating in eDRX. The UE operating in eDRX receiving this change notification may acquire system information at the boundary of next eDRX acquisition period. In a third example, the system information change notification may be a system information change notification for UE operating in eDRX and in RRC INACTIVE state. A UE operating in eDRX and in RRC INACTIVE state may acquire system information immediately, or acquire system information at the next RAN paging cycle.

The said signaling transmitted before a paging occasion may be one of following: (a) a wake up signal (WUS); (b) a signal transmitted on a predefined time and frequency resource, which may be configured by the BS via RRC message or system information; or (c) a DCI which is transmitted on PDCCH. The DCI may be scrambled by a predefined RNTI. The PDCCH occasion used for transmitting the DCI may be configured by BS via RRC message or system information. The PCCH occasion used for transmitting the DCI may be configured by a search space ID. The PCCH occasion may be configured in the same BWP in which the paging occasions is configured. When the signaling is (a) a WUS or (b) a signal transmitted on a predefined time and frequency resource, the system information change notification may be represented by a time/frequency resource, or a code, or a combination of time/frequency resource and a code. As such, different combinations of time domain resources, frequency domain resources and codes, may represent different meanings of indication. The configuration of time domain resource, frequency domain resource and code for a specific meaning of indication may be configured by the BS via RRC message or system information. The UE receives said configuration, and receives said signaling according to said configuration.

In some embodiments, the said signaling may indicate whether the UE should monitor following associated paging occasions. If the signaling indicates that the UE does not need to monitor following associated paging occasions, the UE can skip following associated paging occasions. Otherwise, the UE may monitor following associated paging occasions. In some embodiments, whether the UE should monitor following associated paging occasions when it receives a said signaling may be configured by BS via RRC message or system information. In one embodiment, by default, the UE will skip following associated paging occasions if the said signaling indicates that system information change notification is received. The UE receives said signaling, and determines whether to monitor following associated paging occasions according to said signaling.

With the method provided in this embodiment, the system information change notification can be transmitted before paging occasion. The UE is not required to receive a DCI scheduling paging message or a paging message merely for receiving the system information change notification and UE power is thus saved. With the method provided in this embodiment, when the BS can transmit a system information change notification in said signaling. At the same time, the system information change notification may indicate the UE to skip following associated paging occasions. In this manner, the UE power efficiency is maximized.

In a third embodiment, a transmission of system information value tag or unchanged indicator is performed. A BS can signal in MIB (master information block) or SIB1 a system information value tag which varies when system information is changed. A UE can determine whether the system information is still valid by comparing its locally stored system information's value tag with the value contained in MIB or SIB1. The BS can also signal an indicator in MIB to indicate whether system information is unchanged during the last period of time. The UE can determine whether its locally stored system information is still valid by checking this indicator and the time when the UE acquires a valid system information. For example, if the UE acquired a valid system information no earlier than a predefined time length ago, and the indicator indicates that the system information has not changed since the predefined time length ago, the UE can consider its locally stored system information to be valid.

While there is not enough space in a current MIB message, this embodiment provides a solution for the UE to verify whether its locally stored system information is valid. In this embodiment, the BS includes a system information value tag or a system information unchanged indicator which indicates whether system information is changed at least over a time period in one of following signaling: (a) a DCI which is used to schedule SIB1; (b) a DCI which is used to schedule a paging message, or DCI scrambled by P-RNTI and transmitted on paging occasions; (c) a WUS signal which is transmitted before its associated paging occasions; or (d) a PBCH payload which is not used by current NR standard. The said time period may be predefined by the standard, or signaled by RRC message or system information. The said time period may be a system information validity time which is defined by the standard or signaled by RRC message or system information.

When a UE returns to a cell from another cell, or when a UE operating in eDRX needs to initiate RRC setup or RRC resume, the UE can verify its locally stored system information according to the system information value tag or system information unchanged indicator contained in said signaling. Otherwise, if the BS cannot provide the said system information value tag or system information unchanged indicator, the UE has to acquire the SIB1 message and verify its local system information by checking value tag contained in SIB1 message, which is not suitable for a redcap UE due to repetition and combination.

In a fourth embodiment, a WUS indicator is included in a paging DCI or paging message. In this embodiment, in a DCI scheduling paging message, or a DCI scrambled by P-RNTI and transmitted on paging occasion, the BS includes an indicator which indicates that whether a UE is required to monitor following paging occasions. If the indicator indicates that the UE is not required to monitor following N paging occasions, the UE can skip monitoring following N paging occasions. Otherwise, the UE keeps monitoring the following N paging occasions.

The value N may be pre-defined by standard, or determined according to predefined rule, or indicated in the said DCI or system information. In one embodiment, the value N may be the number of remaining paging occasions within the same PTW and following the paging occasion on which the said DCI is transmitted. In another embodiment, the value N may be the number of remaining paging occasions which is configured to be in the same group with the paging occasion on which the said DCI is transmitted. The BS configures which paging occasions are in a group via RRC message or system information.

In a fifth embodiment, a hyper system frame number (H-SFN) is included in S1B1, DCI scheduling SIB1, or WUS. To support eDRX operation, a hyper system frame is defined which includes 1024 system frames. In eDRX operation, the eDRX cycle may be longer than one hyper system frame. Thus the BS may indicate in system information the current H-SFN which is used for synchronization of timing between UE and BS. If the BS includes all bits or partial bits of H-SFN in the MIB of a cell, a UE operating in eDRX can acquire H-SFN quickly without reading a complete RBI message to get the H-SFN information. But then there will be no enough space in current MIB message.

In this embodiment, the entire H-SFN or part of H-SFN is transmitted within one of following signaling: (a) a DCI which is used to schedule SIB1; (b) a DCI which is used to schedule a paging message, or DCI scrambled by P-RNTI and transmitted on paging occasions; (c) a WUS signal which is transmitted before associated paging occasions; or (d) a PBCH payload which is not used by current standard. If part of H-SFN is transmitted in one of above signaling, the remaining part of H-SFN may be transmitted in SIB1 message. With methods provided in this embodiment, the H-SFN can be transmitted in some quick signaling and the UE can acquire the H-SFN without reading a complete system information message.

In a sixth embodiment, a cell reselection method is provided for redcap UEs. For intra-frequency cell reselection, the BS can configure an intra-frequency neighboring cell list and corresponding parameters for cell reselection. The BS can configure a black cell list including cells a UE should not consider as candidate for cell reselection. For inter-frequency cell reselection, the BS can configure a list of carrier frequencies used for inter frequency cell reselection, i.e. the information about carrier frequencies other than current serving carrier frequency, and a list inter-frequency neighboring cells relevant for cell re-selection.

In one embodiment, for each carrier frequency, the BS configures cell reselection parameters common for a frequency, and optionally configures a list of inter-frequency neighboring cells with cell specific reselection parameters. The BS may configure a black list of inter-frequency neighboring cells which the UE should not consider as candidate for cell reselection. The UE may perform inter-frequency cell reselection in RRC IDLE and RRC INACTIVE state, according to these configurations.

In one embodiment, for inter-frequency cell reselection, the BS configures cell reselection information for a redcap UE in a system information block, with one of following methods.

In a first method, the BS configures a list of inter-frequency carrier frequencies that support redcap UE access. This carrier frequency list is distinguished from current inter-frequency carrier frequency list by its name. A redcap UE considers the carrier frequency configured in this list as candidate carrier frequency for cell reselection. If a neighboring cell list and a black cell list are configured for a carrier frequency in this list, the UE applies the parameter of the cell in the neighboring cell list, and applies the black cell list.

In a second method, the BS can add an indicator in current inter-frequency carrier frequency configuration contained in a current inter-frequency carrier frequency list, to indicate that the corresponding carrier frequency supports redcap UE access. A redcap UE may apply the common cell reselection parameters for this carrier frequency. A redcap UE may apply the inter-frequency neighboring cell list which is contained in the carrier frequency configuration. A redcap UE may apply the inter-frequency black cell list which is contained in the carrier frequency configuration.

In a third method, the BS can add an inter-frequency cell black list configured for redcap UE in an inter-frequency carrier frequency configuration contained in current inter-frequency carrier frequency list. A redcap UE applies this black list, i.e. not considering the cell(s) contained in this black list as candidate for cell reselection.

In a fourth method, the BS can add an inter-frequency neighbor cell list dedicated for redcap UE in an inter-frequency carrier frequency configuration in current inter-frequency carrier frequency list. A redcap UE may consider the neighboring cell contained in this list as candidate for cell reselection. A redcap UE may apply the cell reselection parameters contained in this list for cell reselection.

In a fifth method, the BS can add an indicator in an inter-frequency neighbor cell configuration contained in a current inter-frequency carrier frequency configuration structure. This indicator is used to indicate that a redcap UE can access the corresponding neighboring cell or a redcap UE can consider the corresponding neighboring cell as candidate cell for cell reselection. The UE applies the cell reselection parameters configured for the neighboring cell.

In a sixth method, the BS can add, in an inter-frequency carrier frequency configuration, a cell reselection priority dedicated for redcap UE. A redcap UE can apply this cell reselection priority when performing cell reselection evaluation.

In one embodiment, for intra-frequency cell reselection, the BS configures cell reselection information for a redcap UE, with one of following methods.

In a first method, the BS can add an intra-frequency cell black list dedicated for redcap UE in a system information block. A redcap UE applies this black list, i.e. not considering the cell(s) contained in this black list as candidate for cell reselection.

In a second method, the BS can add an intra-frequency neighbor cell list dedicated for redcap UE in a system information block. A redcap UE may consider the neighboring cell(s) contained in this list as candidate for cell reselection. A redcap UE may apply the cell reselection parameter(s) contained in this list for cell reselection.

In a second method, the BS can add an indicator in an intra-frequency neighbor cell configuration contained in a system information block. This indicator is used to indicate that a redcap UE can access the corresponding neighboring cell or a redcap UE can consider the corresponding neighboring cell as candidate cell for cell reselection. The UE applies the cell reselection parameters configured for the neighboring cell.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device having a first device type, the method comprising:
   receiving, from a wireless communication node, in a same system information block (SIB) that is shared with devices of a second device type, configuration information that comprises a first configuration associated with the first device type and a second configuration associated with the second device type, wherein the first configuration is associated with a downlink bandwidth part (BWP) that is specific to the first device type, wherein the second configuration is associated with an initial downlink BWP associated with the second device type, wherein a device having the first device type is a reduced capability device and a device having the second device type is not a reduced capability device; and
   initiating a Radio Resource Control (RRC) procedure with the wireless communication node in response to detecting a paging message from the wireless communication node according to the first configuration.

2. A non-transitory computer-readable storage medium storing computer-executable instructions that when executed perform the method of claim 1.

3. The method of claim 1, wherein the detecting the paging message comprises:

monitoring paging occasions based on the first configuration, wherein:
the first configuration comprises information related to at least one of:
a search space configuration dedicated for paging occasion monitoring associated with the first device type, and
a control resource set configuration associated with the first device type.

4. A wireless communication device having a first device type, comprising at least one processor configured to cause the wireless communication device to:
receive, from a wireless communication node, in a same system information block (SIB) that is shared with devices of a second device type, configuration information that comprises a first configuration associated with the first device type and a second configuration associated with the second device type, wherein the first configuration is associated with a downlink bandwidth part (BWP) that is specific to the first device type, wherein the second configuration is associated with an initial downlink BWP associated with the second device type, wherein a device having the first device type is a reduced capability device and a device having the second device type is not a reduced capability device; and
initiating a Radio Resource Control (RRC) procedure with the wireless communication node in response to detecting a paging message from the wireless communication node according to the first configuration.

5. The wireless communication device of claim 4, wherein the at least one processor is configured to cause the wireless communication device to detect the paging message based on:
monitoring paging occasions based on the first configuration, wherein:
the first configuration comprises information related to at least one of:
a search space configuration dedicated for paging occasion monitoring associated with the first device type, and
a control resource set configuration associated with the first device type.

6. A wireless communication device, comprising at least one processor configured to cause the wireless communication device to:
transmit, to a first wireless communication device having a first device type, configuration information in a same system information block (SIB) that is shared with devices of a second device type, wherein the configuration information comprises a first configuration associated with the first device type and a second configuration associated with the second device type to enable the first wireless communication device to monitor paging occasions based on the first configuration,
wherein the first configuration is associated with a downlink bandwidth part (BWP) that is specific to the first device type, wherein the second configuration is associated with an initial downlink BWP associated with the second device type, wherein a device having the first device type is a reduced capability device and a device having the second device type is not a reduced capability device;
perform a Radio Resource Control (RRC) procedure with the first wireless communication device having the first device type in response to a paging message transmitted according to the first configuration.

7. The wireless communication device of claim 6, wherein the first configuration comprises information related to at least one of:
a search space configuration dedicated for paging occasion monitoring associated with the first device type, and
a control resource set configuration associated with the first device type.

8. A method performed by a wireless communication node, the method comprising:
transmitting, to a first wireless communication device having a first device type, configuration information in a same system information block (SIB) that is shared with devices of a second device type, wherein the configuration information comprises a first configuration associated with the first device type and a second configuration associated with the second device type to enable the first wireless communication device to monitor paging occasions based on the first configuration,
wherein the first configuration is associated with a downlink bandwidth part (BWP) that is specific to the first device type, wherein the second configuration is associated with an initial downlink BWP associated with the second device type, wherein a device having the first device type is a reduced capability device and a device having the second device type is not a reduced capability device;
perform a Radio Resource Control (RRC) procedure with the first wireless communication device having the first device type in response to a paging message transmitted according to the first configuration.

9. A non-transitory computer-readable storage medium storing computer-executable instructions that when executed perform the method of claim 8.

10. The method of claim 8, wherein the first configuration comprises information related to at least one of:
a search space configuration dedicated for paging occasion monitoring associated with the first device type, and
a control resource set configuration associated with the first device type.

* * * * *

UNITED STATES PATENT AND TRADEMARK OFFICE
CERTIFICATE OF CORRECTION

| | | |
|---|---|---|
| PATENT NO. | : 12,349,107 B2 | Page 1 of 1 |
| APPLICATION NO. | : 18/105671 | |
| DATED | : July 1, 2025 | |
| INVENTOR(S) | : Jianxun Ai et al. | |

It is certified that error appears in the above-identified patent and that said Letters Patent is hereby corrected as shown below:

On the Title Page

Item (63):
Delete "PCT/CN2020/007316"
Replace with --PCT/CN2020/107316--

Signed and Sealed this
Sixteenth Day of September, 2025

Coke Morgan Stewart
*Acting Director of the United States Patent and Trademark Office*